United States Patent
Sawa

(10) Patent No.: US 10,412,242 B2
(45) Date of Patent: Sep. 10, 2019

(54) IMAGE FORMING SYSTEM, NON-TRANSITORY COMPUTER READABLE RECORDING MEDIUM STORING USER IDENTIFYING PROGRAM, AND IMAGE FORMING APPARATUS

(71) Applicant: KYOCERA Document Solutions Inc., Osaka (JP)

(72) Inventor: Naoki Sawa, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/925,303

(22) Filed: Mar. 19, 2018

(65) Prior Publication Data
US 2018/0278766 A1    Sep. 27, 2018

(30) Foreign Application Priority Data
Mar. 22, 2017  (JP) .................................. 2017-056618

(51) Int. Cl.
*H04N 1/00* (2006.01)
(52) U.S. Cl.
CPC ..... *H04N 1/00442* (2013.01); *H04N 1/00352* (2013.01); *H04N 1/00461* (2013.01); *H04N 2201/3205* (2013.01)
(58) Field of Classification Search
None
See application file for complete search history.

(56) References Cited

U.S. PATENT DOCUMENTS

| 7,258,498 B2* | 8/2007 | Hatta | H04N 1/00132 358/1.9 |
|---|---|---|---|
| 2002/0044299 A1* | 4/2002 | Iwase | H04L 29/06 358/1.15 |
| 2002/0196452 A1* | 12/2002 | Komiya | G06K 15/007 358/1.1 |
| 2003/0007172 A1* | 1/2003 | Takayanagi | G06F 21/608 358/1.15 |
| 2003/0063304 A1* | 4/2003 | Satomi | G06F 21/10 358/1.11 |
| 2003/0092455 A1* | 5/2003 | Natsuno | G06Q 30/02 455/466 |
| 2004/0053637 A1* | 3/2004 | Iida | H04N 1/00127 455/550.1 |

(Continued)

FOREIGN PATENT DOCUMENTS

JP    2001-113801    4/2001

*Primary Examiner* — Anh-Vinh T Nguyen

(57) ABSTRACT

In a mobile terminal apparatus, a user identifying unit (a) extracts a printed matter image of a printed matter in a photo image taken by an imaging device, (b) transmits to an image forming apparatus a user inquiry with the printed matter image, (c) receives a response to the user inquiry from the image forming apparatus, and (d) displays the photo image on a display device and displays the user name indicated by the response so as to accompany the printed matter image in the displayed photo image. In the image forming apparatus, a printed matter history managing unit determines a document image that agrees with a printed matter image on the basis of a printed matter history upon receiving the user inquiry and the printed matter image, and transmits as the response a user name of a user associated with the determined document image.

2 Claims, 7 Drawing Sheets

(56) References Cited

U.S. PATENT DOCUMENTS

| | | | |
|---|---|---|---|
| 2006/0050292 A1* | 3/2006 | Morikawa | H04N 1/32122 358/1.13 |
| 2006/0050297 A1* | 3/2006 | Morikawa | H04N 1/32122 358/1.15 |
| 2006/0250476 A1* | 11/2006 | Silverbrook | B41J 29/02 347/108 |
| 2006/0285168 A1* | 12/2006 | Horino | H04N 1/387 358/3.28 |
| 2007/0035763 A1* | 2/2007 | Bard | G06F 3/1222 358/1.15 |
| 2007/0052997 A1* | 3/2007 | Hull | G06K 9/00463 358/1.15 |
| 2008/0024816 A1* | 1/2008 | Lee | H04N 1/00278 358/1.15 |
| 2008/0139889 A1* | 6/2008 | Bagan | A61B 5/0002 600/300 |
| 2011/0002012 A1* | 1/2011 | Amagai | G06K 19/06046 358/3.28 |
| 2011/0038006 A1* | 2/2011 | Sato | H04N 1/00347 358/1.15 |
| 2011/0116125 A1* | 5/2011 | Park | G06F 3/1204 358/1.15 |
| 2012/0262753 A1* | 10/2012 | Viccari | H04N 1/00307 358/1.15 |
| 2013/0163048 A1* | 6/2013 | Kida | G06F 3/1296 358/1.15 |
| 2013/0182002 A1* | 7/2013 | Macciola | H04N 1/387 345/589 |
| 2013/0226865 A1* | 8/2013 | Munemann | G06F 3/0482 707/609 |
| 2015/0085317 A1* | 3/2015 | Kim | G06F 3/0488 358/1.15 |
| 2015/0146243 A1* | 5/2015 | Tsujimoto | G06F 3/1207 358/1.15 |
| 2017/0006169 A1* | 1/2017 | Ito | G06F 3/1203 |
| 2017/0169495 A1* | 6/2017 | Rathus | G06F 21/36 |
| 2017/0208181 A1* | 7/2017 | Kim | H04N 1/0023 |
| 2018/0218301 A1* | 8/2018 | Shike | E02F 9/20 |
| 2019/0018624 A1* | 1/2019 | Naruse | G06F 3/1204 |
| 2019/0020776 A1* | 1/2019 | Maeda | G06F 3/1204 |
| 2019/0141209 A1* | 5/2019 | Tsujimoto | H04N 1/00954 |

* cited by examiner

IMAGE FORMING SYSTEM, NON-TRANSITORY COMPUTER READABLE RECORDING MEDIUM STORING USER IDENTIFYING PROGRAM, AND IMAGE FORMING APPARATUS

CROSS-REFERENCE TO RELATED APPLICATIONS

This application relates to and claims priority rights from Japanese Patent Application No. 2017-056618, filed on Mar. 22, 2017, the entire disclosures of which are hereby incorporated by reference herein.

BACKGROUND

1. Field of the Present Disclosure

The present disclosure relates to an image forming system, a non-transitory computer readable recording medium storing a user identifying program, and an image forming apparatus.

2. Description of the Related Art

In an image forming apparatus (i.e. a printer, a multi function peripheral or the like) available for plural users, printed matters of the plural users are outputted onto a tray or the like and such printed matters are sometimes mingled on the tray or the like.

To identify a user who causes it to output a printer matter, an image forming apparatus outputs the printed matter that includes a document image to which a user name is attached.

However, when a user name is attached to a document image, since a user name is a relatively long text and is not a meaningless text, a style of the printed matter is broken.

SUMMARY

An image forming system according to an aspect of the present disclosure includes an image forming apparatus and a mobile terminal apparatus capable of communicating with the image forming apparatus. The image forming apparatus includes (a) a printing device configured to output a printed matter obtained by printing a document image specified by a print request of a user, and (b) a printed matter history managing unit configured to store, as a printed matter history, the document image and a user name of the user to a predetermined storage device so as to associate the document image and the user name with each other. The mobile terminal apparatus includes an imaging device, a display device, and a user identifying unit. The user identifying unit (a) extracts a printed matter image of the printed matter in a photo image taken by the imaging device, (b) transmits to the image forming apparatus a user inquiry with the printed matter image using a predetermined communication device, (c) receives from the image forming apparatus using a predetermined communication device a response that indicates a user name of a user of the document image that agrees with the printed matter image, and (d) displays the photo image on the display device and displays the user name indicated by the response so as to accompany the printed matter image in the displayed photo image. The printed matter history managing unit determines the document image that agrees with the printed matter image on the basis of the printed matter history upon receiving the user inquiry and the printed matter image from the mobile terminal apparatus, and transmits to the mobile terminal apparatus, as the response of the user inquiry, the user name of the user associated with the determined document image.

A non-transitory computer readable recording medium stores a user identifying program. The user identifying program causes a computer to act as a user identifying unit, and the computer is included in a mobile terminal apparatus capable of communicating with an image forming apparatus that outputs a printed matter obtained by printing a document image, the mobile terminal apparatus comprising an image device and a display device. The user identifying unit (a) extracts a printed matter image of the printed matter in a photo image taken by the imaging device, (b) transmits to the image forming apparatus a user inquiry with the printed matter image using a predetermined communication device, (c) receives from the image forming apparatus using a predetermined communication device a response that indicates a user name of a user of the document image that agrees with the printed matter image, and (d) displays the photo image on the display device and displays the user name indicated by the response so as to accompany the printed matter image in the displayed photo image.

An image forming apparatus according to an aspect of the present disclosure includes a printing device and a printed matter history managing unit. The printing device is configured to output a printed matter obtained by printing a document image specified by a print request of a user. The printed matter history managing unit is configured to store, as a printed matter history, the document image and a user name of the user to a predetermined storage device so as to associate the document image and the user name with each other. Further, the printed matter history managing unit determines the document image that agrees with a printed matter image on the basis of the printed matter history upon receiving a user inquiry and the printed matter image from a mobile terminal apparatus, and transmits to the mobile terminal apparatus, as the response of the user inquiry, a user name of a user associated with the determined document image.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
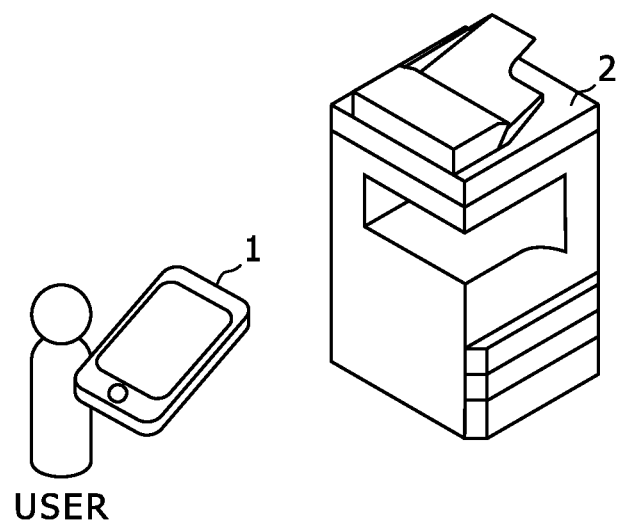
FIG. 1 shows a block diagram that indicates a configuration of an image forming system in an embodiment of the present disclosure.

FIG. 1 shows a block diagram that indicates a configuration of an image forming system in an embodiment of the present disclosure. In the system shown in FIG. 1, a mobile terminal apparatus 1 such as a smartphone is carried by a user who uses an image forming apparatus 2. The mobile terminal apparatus 1 and the image forming apparatus 2 are capable of communicating with each other using wireless communication or the like. In this system, plural users carries plural mobile terminal apparatuses 1, respectively, and can use the image forming apparatus 2 using his/her own mobile terminal apparatus 1.

Figure 2:
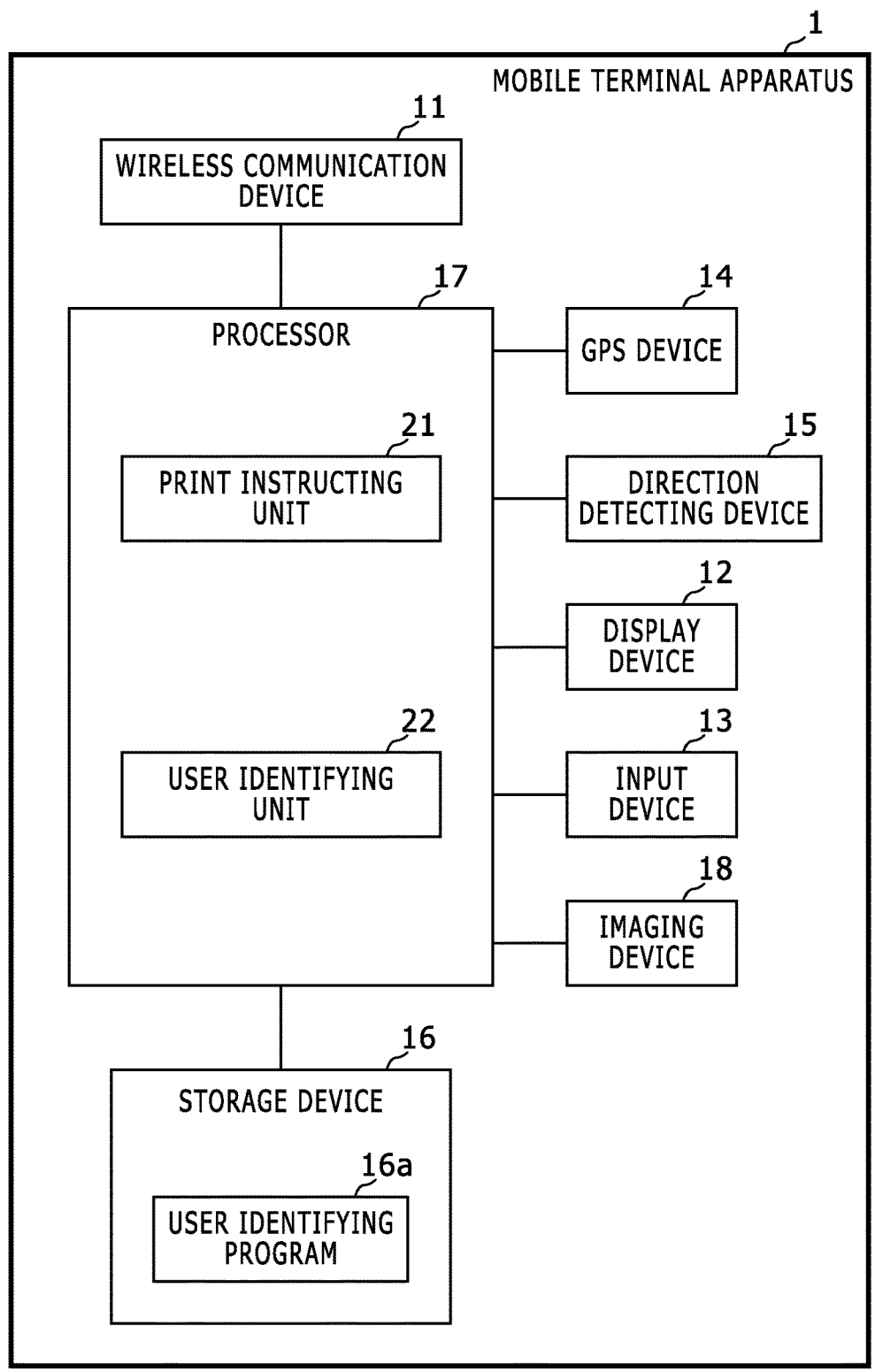
FIG. 2 shows a block diagram that indicates a configuration of a mobile terminal apparatus 1 shown in FIG. 1.

FIG. 2 shows a block diagram that indicates a configuration of a mobile terminal apparatus 1 shown in FIG. 1.

The mobile terminal apparatus 1 includes a wireless communication device 11, a display device 12, an input device 13, a GPS device 14, a direction detecting device 15, a storage device 16, a processor 17, and an imaging device 18.

The wireless communication device 11 is a communication circuit according to a predetermined a wireless communication standard. The wireless communication device 11 is a wireless LAN interface and/or a mobilephone network interface (an RF interface, a baseband unit and the like).

The display device 12 is a device such as a liquid crystal display arranged on a housing of the mobile terminal apparatus 1 and displays sorts of screens to a user.

The input device 13 is a device such as a touch panel arranged on the display device 12 and detects a user operation.

The GPS device 14 is a device that determines an absolute position (latitude, longitude, and altitude) of this GPS device 14, i.e. the mobile terminal apparatus 1 using GPS (Global Positioning System).

The direction detecting device 15 is a device that includes a gyro sensor, an electromagnetic compass or the like and detects a posture (a direction) of the mobile terminal apparatus 1.

The storage device 16 is a nonvolatile storage device such as a flash memory and stores a program and data. The storage device 16 stores user identifying program 16a as an application program.

Further, the processor 17 is a computer that includes a CPU (Central Processing Unit), a ROM (Read Only Memory), a RAM (Random Access Memory) and the like, and loads a program to the RAM from the storage device 16, the ROM or the like and executes the program using the CPU and thereby acts as sorts of processing units.

In this embodiment, the processor 17 acts (a) as a print instructing unit 21 by executing an unshown driver program and (b) as a user identifying unit 22 by executing the user identifying program 16a.

The print instructing unit 21 transmits a print request to the image forming apparatus 2 using the wireless communication device 11 in accordance with a user operation inputted to the input device 13.

The user identifying unit 22 (a) extracts a printed matter image of a printed matter in a photo image taken by the imaging device 18, (b) transmits to the image forming apparatus 2 a user inquiry with the printed matter image using a predetermined communication device (here, the wireless communication device 11), (c) receives from the image forming apparatus 2 using the communication device a response that indicates a user name of a user of the document image that agrees with the printed matter image, and (d) displays the photo image on the display device 12 and displays the user name indicated by the response so as to accompany the printed matter image in the displayed photo image.

Figure 3:
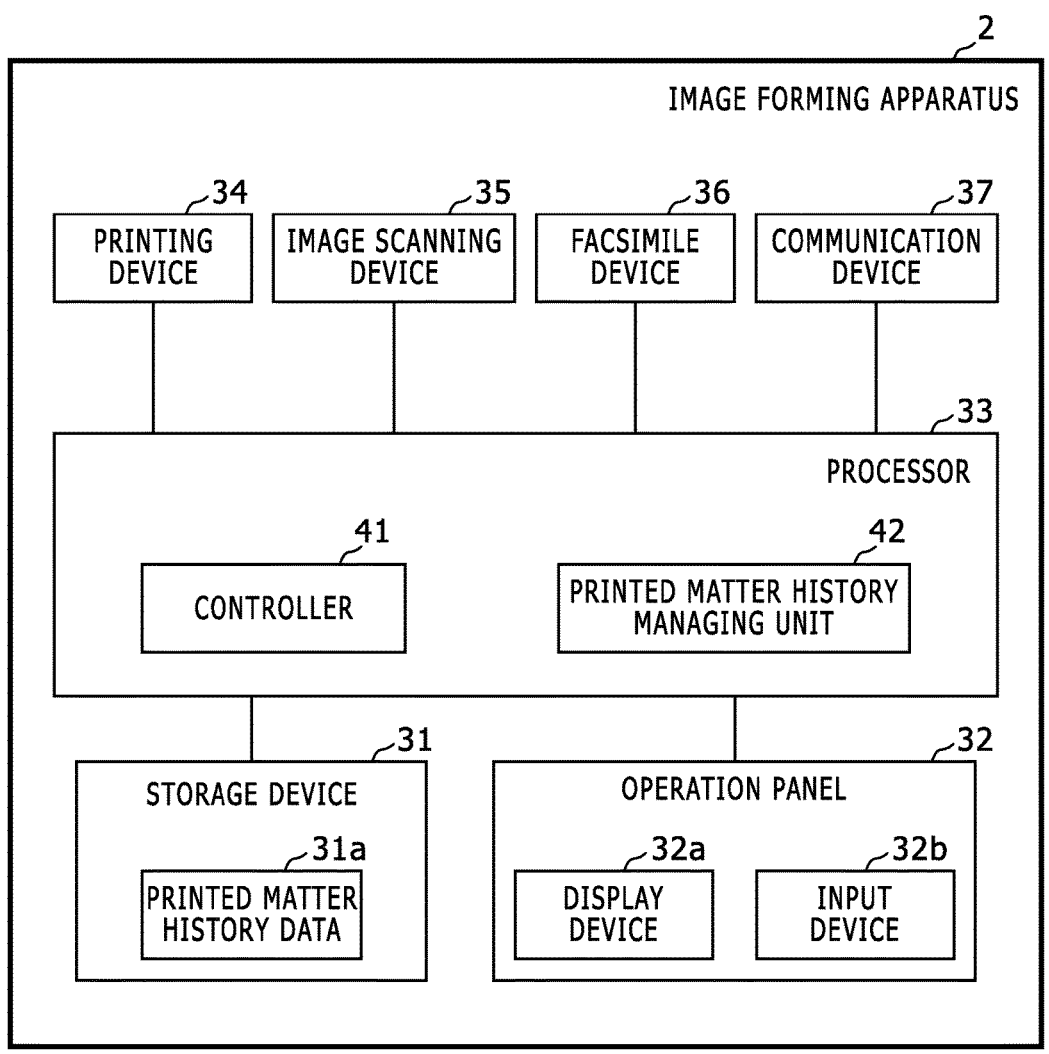
FIG. 3 shows a block diagram that indicates a configuration of an image forming apparatus 2 shown in FIG. 1.

FIG. 3 shows a block diagram that indicates a configuration of the image forming apparatus 2 shown in FIG. 1.

The image forming apparatus 2 shown in FIG. 1 includes a storage device 31, an operation panel 32, a processor 33, a printing device 34, an image scanning device 35, a facsimile device 36, a communication device 37 and the like.

The storage device 31 is a nonvolatile storage device such as a flash memory, and printed matter history data 31a is stored in the storage device 31.

The operation panel 32 is arranged in a front side on an upper surface of the housing, and includes a display device 32a such as a liquid crystal display and an input device 32b such as a touch panel. The display device 32a displays sorts of screens to a user, and the input device 32b receives a user operation inputted by a user.

Further, the processor 33 is a computer that includes a CPU, a ROM, and a RAM, and loads a program to the RAM from the ROM or an unshown storage device and executes the program using the CPU and thereby acts as sorts of processing units. The processor 33 acts as a controller 41 and a printed matter history managing unit 42.

The printing device 34 prints a document image or the like on a printing paper sheet on the basis of image data. Specifically, the printing device 34 outputs a printed matter obtained by printing a document image specified by a print request of a user.

Further, the image scanning device 35 optically scans a document image of a document and generates image data of the document image. The facsimile device 36 generates and transmits a facsimile signal of a document image or the like based on image data, and receives a facsimile signal from an external device and generates image data from the received facsimile signal. The communication device 37 is a wireless or wired network interface or the like, and performs data communication with an external device (e.g. the mobile terminal apparatus 1, another host device such as a personal computer, or the like).

The controller 41 controls internal devices such as the printing device 34, the image scanning device 35, the facsimile device 36, and the communication device 37, and thereby performs sorts of processes. For example, the controller 41 receives a print request, and upon receiving the print request, causes the printing device 34 to perform printing of a document image specified by the print request.

The printed matter history managing unit 42 determines a user name of a user as a requester of the print request on the basis of the print request in which the user name is described, and stores as a printed matter history (i.e. printed matter history data 31a) a document image to be printed and this user name in the storage device 31 so as to associate the document image and the user name with each other.

Further, upon receiving a user inquiry and a printed matter image from the mobile terminal apparatus 1 using the communication device 37, the printed matter history managing unit 42 determines a document image that agrees with the printed matter image on the basis of the printed matter history (i.e. the printed matter history data 31a), and transmits to the mobile terminal apparatus 1, as the response of the user inquiry, the user name of the user associated with the determined document image. For example, for searching the printed matter history data 31a for a document image that agrees with the printed matter image, the printed matter history managing unit 42 zooms the printed matter image or the document image so as to make sizes and shapes of the both images agree with each other, and thereafter determines whether the both images agree with each other or not. The determination whether the both images agree with each other or not is performed as (a) determination whether pixel value distributions of the both images agree with each other by a ratio that is equal to or larger than a threshold value, (b) determination whether objects (characters or the like) detected in the both images agree with each other by a ratio that is equal to or larger than a threshold value, or the like.

Figure 4:
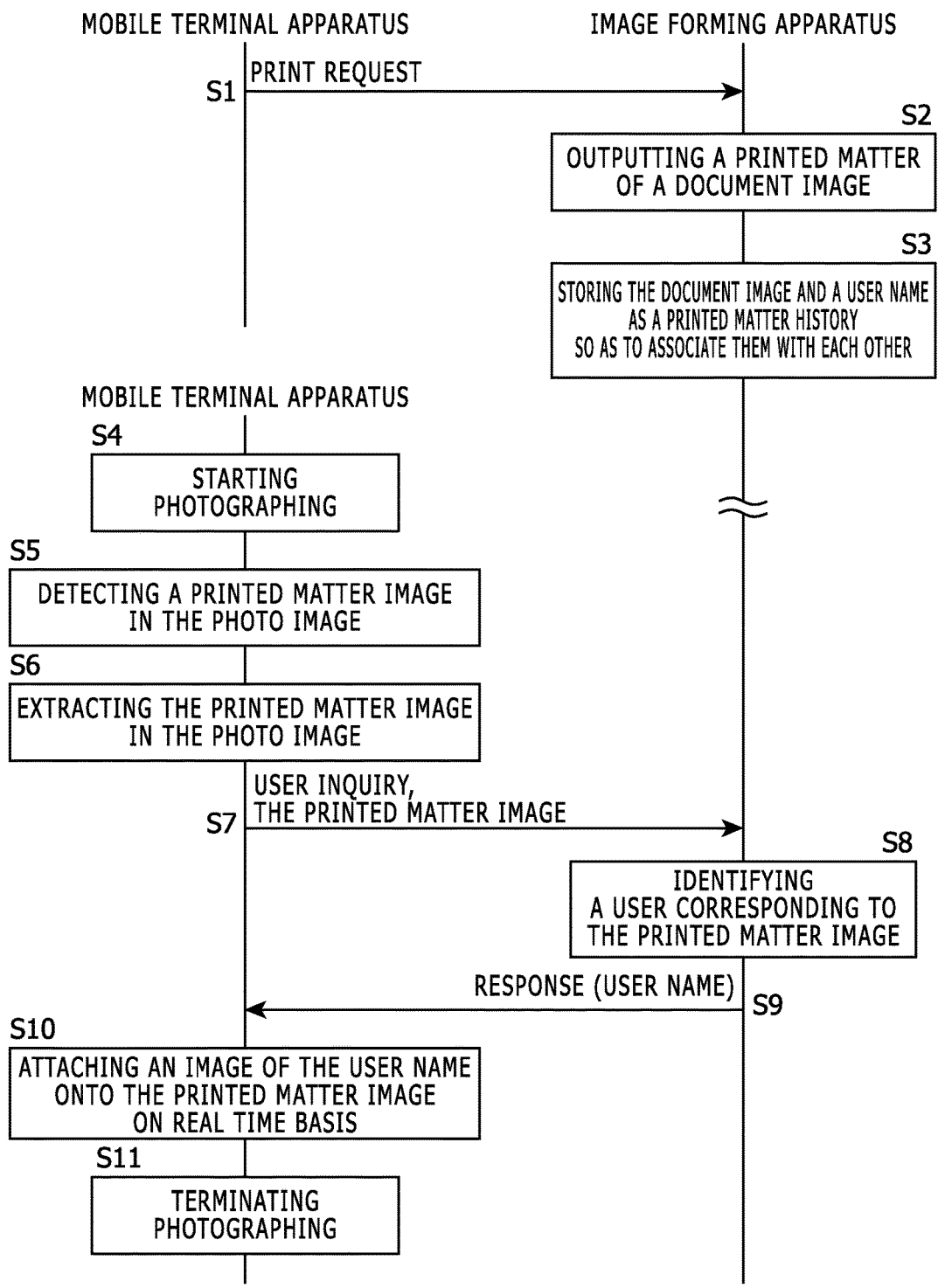
FIG. 4 shows a sequence diagram that explains a behavior of the image forming system shown in FIG. 1.

The following part explains a behavior of the aforementioned image forming system. FIG. 4 shows a sequence diagram that explains a behavior of the image forming system shown in FIG. 1.

Firstly, a user operates the mobile terminal apparatus and thereby causes the mobile terminal apparatus 1 to transmit a print request to the image forming apparatus 2 (in Step S1).

In the image forming apparatus 2, the controller 41 receives the print request using the communication device 37, and upon receiving the print request, causes the printing device 34 to perform a printing process. In the printing process, the printing device 34 outputs a printed matter obtained by printing on a printing paper sheet a document image specified by the print request (in Step S2).

Upon performing the output of the printed matter, the printed matter history managing unit 42 determines a user name included in the print request, and stores as the printed matter history data 31a in the storage device 31 the document image of this printed matter and the determined user name (in Step S3).

Afterward, this user or another user operates his/her mobile terminal apparatus 1 and thereby causes the mobile terminal apparatus 1 to execute the user identifying program 16a and causes the mobile terminal apparatus 1 to take a photo image of the printed matter (in Step S4).

In the mobile terminal apparatus 1, the user identifying unit 22 searches for a printed matter image in the photo image. If a printed matter exists in a visual field of the imaging device 18, then the user identifying unit 22 detects a printed matter image in the photo image (in Step S5).

For example, the user identifying unit 22 detects an area of a quadrangular shape (substantial rectangular shape or substantial parallelogram shape), and if four side parts of the detected area is white, then the user identifying unit 22 detects an image of this area as a printed matter image.

Subsequently, the user identifying unit 22 extracts the image of this area, converts the image to a rectangular image using coordinate transformation or the like (in Step S6), and transmits a user inquiry and this printed matter image to the image forming apparatus 2 using the wireless communication device 11 (in Step S7).

In the image forming apparatus 2, the printed matter history managing unit 42 receives the user inquiry and this printed matter image using the communication device 37, and upon receiving the user inquiry and this printed matter image, searches for this printed matter image a document image in the printed matter history data 31a. If a document image that agrees with the printed matter image is detected by the search, then the printed matter history managing unit determines a user name associated with the detected document image, and transmits a response that includes the determined user name to the mobile terminal apparatus 1 (in Step S9).

In the mobile terminal apparatus 1, the user identifying unit 22 receives the response using the wireless communication device 11, and upon receiving the response, displays the user name included in the response so as to accompany the printed matter image currently detected in the photo image (in Step S10). Here, the photo image is repeatedly updated on real time basis, and the printed matter image is continuously detected in the photo image, and the user name is attached to this printed matter image. In other words, if the printed matter image is located within the photo image although a visual field of the imaging device 18 is moved, then the user name follows the printed matter image and thereby is displayed on Augmented Reality (AR) basis.

Figure 5:
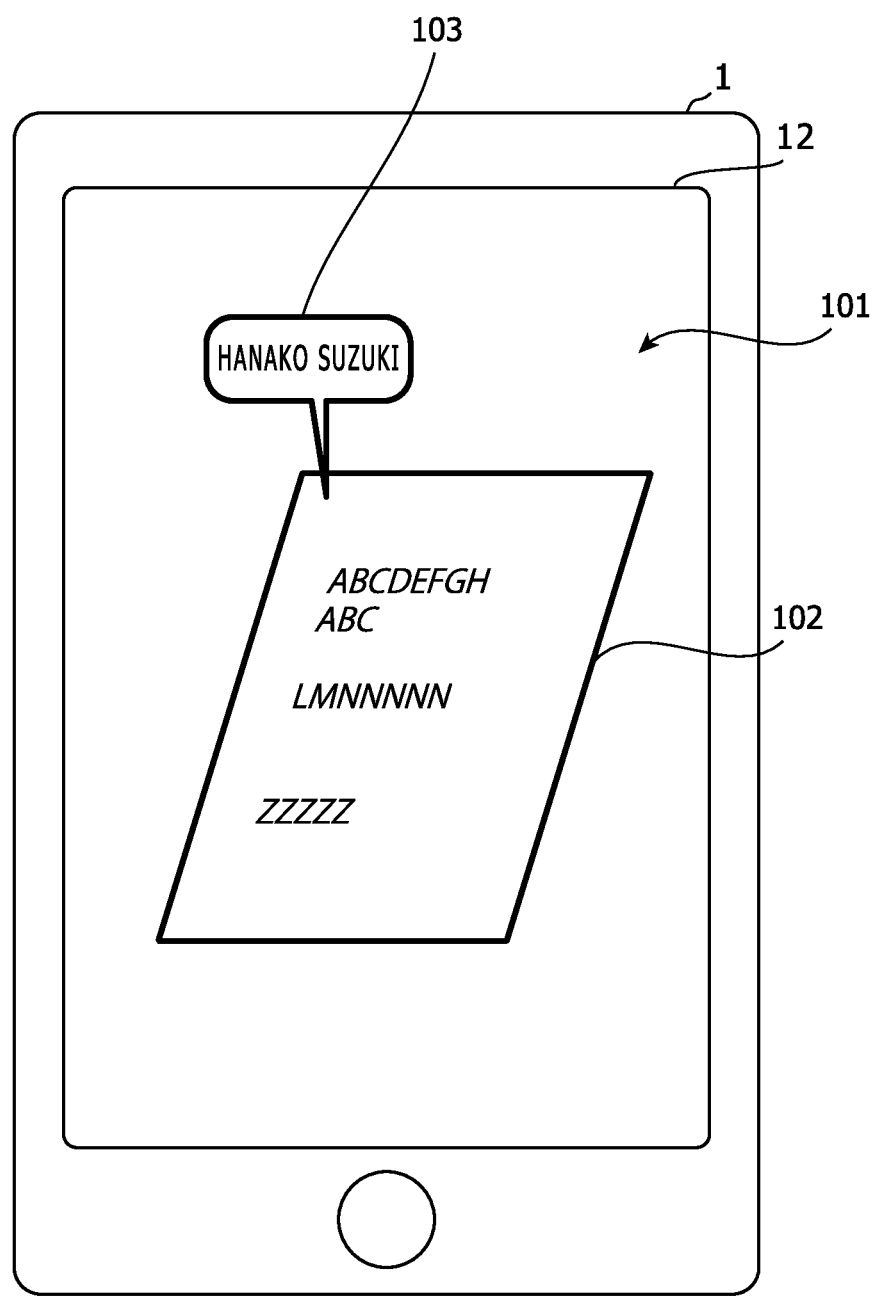
FIG. 5 shows a diagram that indicates an example of (a) a printed matter image and (b) a user name, displayed on the mobile terminal apparatus 1 shown in FIG. 1.

FIG. 5 shows a diagram that indicates an example of (a) a printed matter image and (b) a user name, displayed on the mobile terminal apparatus 1 shown in FIG. 1. For example, as shown in FIG. 5, an image 103 of a user name is displayed so as to accompany a printed matter image 102 in a photo image 101.

Displaying this user name is continuously performed until the end of photographing based on a user operation (until Step S11).

The following part explains a case that plural document images were printed as same as each other.

(a) If the document image to be printed agrees with an document image in the printed matter history data 31a, then the printed matter history managing unit 42 (a1) embeds marking information in the document image to be printed and (a2) additionally stores, as printed matter history data 31a, the document image in which the marking information was embedded and the aforementioned user name so as to associate them with each other, and (b) if the document image to be printed does not agree with any document images in the printed matter history data 31a, then the printed matter history managing unit 42 (b1) does not embed the marking information in the document image to be printed and (b2) additionally stores, as printed matter history data 31a, the document image in which the marking information was not embedded and the aforementioned user name so as to associate them with each other. Therefore, (a) if the document image to be printed agrees with a document image in the printed matter history data 31a, then the printed matter is obtained by printing the document image in which the marking information was embedded, and (b) if the document image to be printed does not agree with any document images in the printed matter history data 31a, then the printed matter is obtained by printing the document image in which the marking information was not embedded. Consequently, even in a case that plural document images were printed as same as each other, these document images are managed individually on the basis of whether the marking information exists or not.

Further, when the document image to be printed agrees with a document image in the printed matter history data 31a, if the document image in which the marking information was embedded agrees with a document image in the printed matter history data 31a, then the printed matter history managing unit 42 embeds other marking information than the embedded marking information. Consequently, even in a case that three or more document images were printed as same as each other, these document images are managed individually on the basis of (a) whether the marking information exists or not and (b) a sort of the marking information.

It should be noted that the marking information may be embedded by adding a micro figure (for example, a figure of which a size is equal to or smaller than one character in the document image) of a specific shape (e.g. triangle shape, star shape or the like) in a margin of a document image and/or may be embedded by changing a font of a text in the document image to a specific font.

Figure 6:
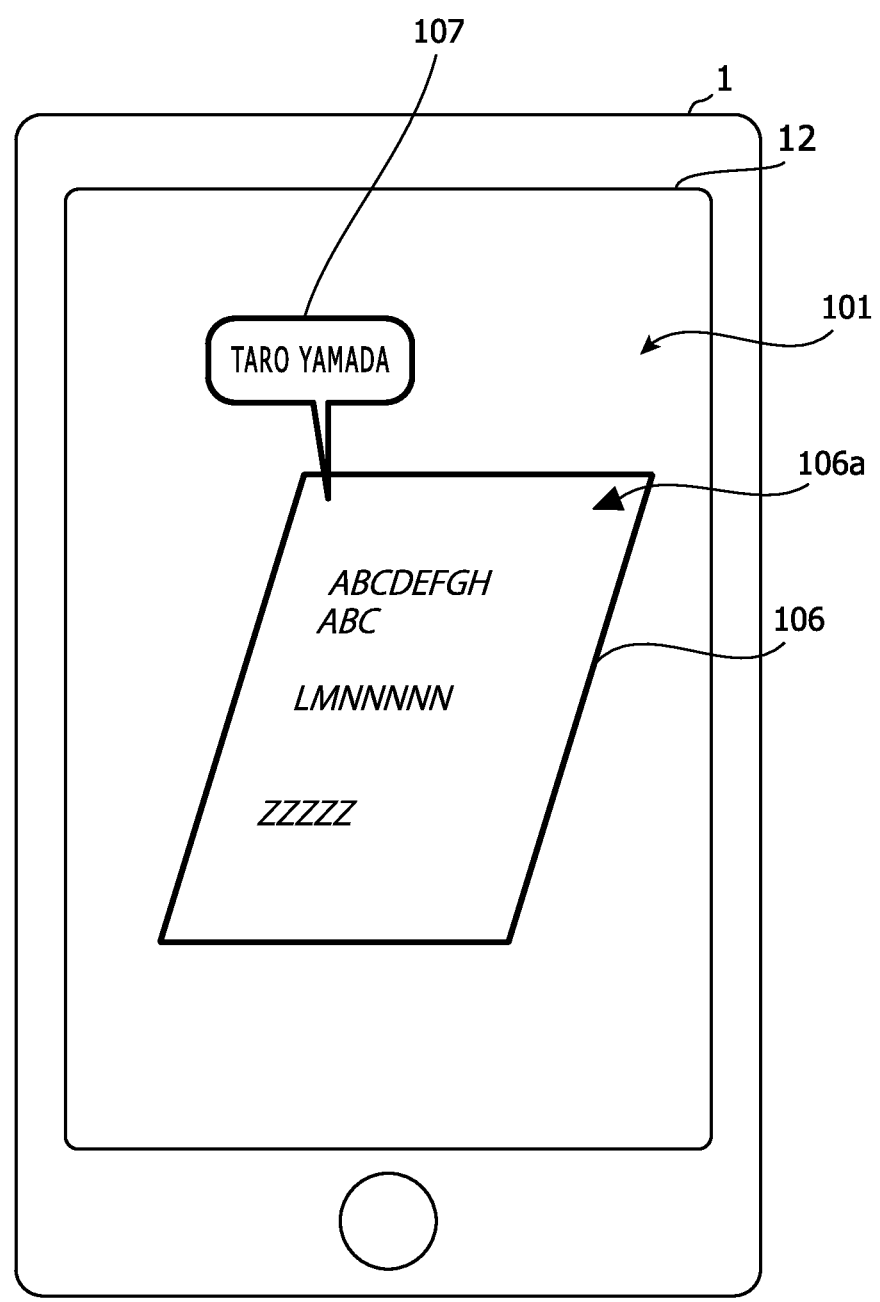
FIG. 6 shows a diagram that indicates an example of (a) a printed matter image in which marking information was embedded and (b) a user name, displayed on the mobile terminal apparatus 1 shown in FIG. 1.

FIG. 6 shows a diagram that indicates an example of (a) a printed matter image in which marking information was embedded and (b) a user name, displayed on the mobile terminal apparatus 1 shown in FIG. 1.

For example, if a printed matter as same as the printed matter shown in FIG. 5 is outputted by the image forming apparatus 2, then as shown in FIG. 6, the marking information 106a is embedded in the printed matter image 106. Therefore, the printed matter history managing unit 42 of the image forming apparatus 2 determines a user name on the basis of the marking information 106a embedded in the printed matter image received with the user inquiry. Consequently, if a same printed matter is outputted by another user (e.g. "TARO YAMADA" in FIG. 6), then an image 107 of a user name of this another user is displayed as shown in FIG. 6.

The following part explains a case that plural printed matter images exist in the single photo image.

If plural printed matter images are extracted in the photo image, the user identifying unit 22 of the mobile terminal apparatus 1 (a) assigns plural identifiers (e.g. unique index numbers) to the plural printed matter images respectively, (b) transmits to the image forming apparatus 2 a user inquiry with the plural identifiers and the printed matter images associated with the plural identifiers using the wireless communication device 11 or the like, (c) receives from the image forming apparatus 2 using the wireless communication device 11 or the like a response that indicates plural user names of plural document images that agree with the printed matter images respectively, and (d) displays the photo image on the display device and displays the plural user names indicated by the response so as to accompany the plural printed matter images in the displayed photo image respectively.

Upon receiving the user inquiry and the plural printed matter images from the mobile terminal apparatus 1, the printed matter history managing unit 42 of the image forming apparatus 2 determines document images that agree with the received plural printed matter images respectively on the basis of the printed matter history data 31a, and transmits the aforementioned response that indicates the plural user names to the mobile terminal apparatus 1.

Consequently, when plural printed matters enter a visual field of the imaging device 18, corresponding user names are displayed with plural printed matter images, respectively.

Figure 7:
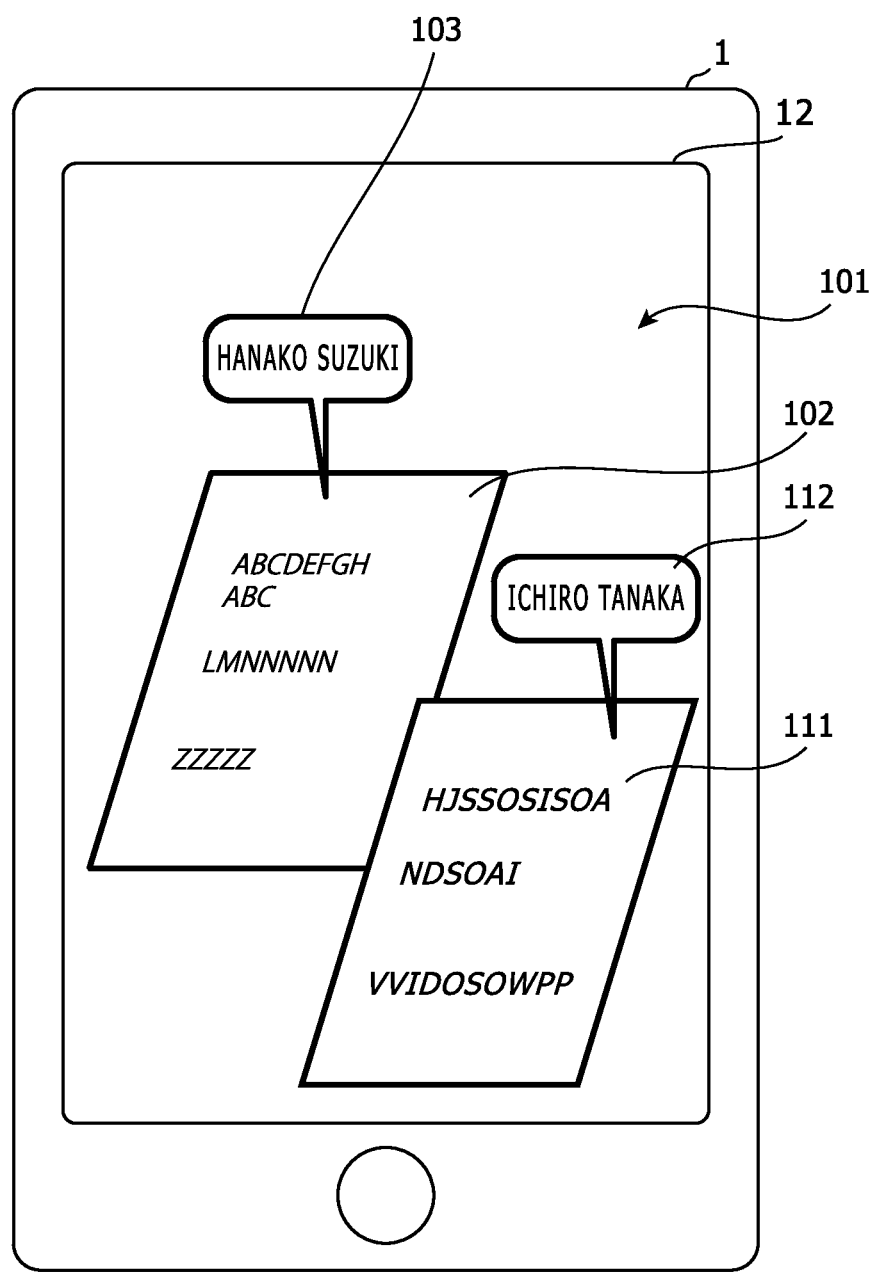
FIG. 7 shows a diagram that indicates an example of (a) plural printed matter images and (b) user names, displayed on the mobile terminal apparatus 1 shown in FIG. 1.

FIG. 7 shows a diagram that indicates an example of (a) plural printed matter images and (b) user names, displayed on the mobile terminal apparatus 1 shown in FIG. 1.

As shown in FIG. 7, if two printed matter images 102 and 111 are detected, then corresponding user names are determined, respectively, and images 103 and 112 of these user names are displayed so as to associate the user names with the printed matter images 102 and 111 respectively.

In the aforementioned embodiment, the printed matter history managing unit 42 of the image forming apparatus 2 stores, as a printed matter history, a document image and a user name in a print request to a predetermined storage device so as to associate the document image and the user name with each other. The user identifying unit 22 of the mobile terminal apparatus 1 (a) extracts a printed matter image of the printed matter in a photo image taken by the imaging device 18, (b) transmits a user inquiry with the printed matter image to the image forming apparatus 2, (c) receives from the image forming apparatus 2 a response that indicates a user name of a user of the document image that agrees with the printed matter image, and (d) displays the photo image on the display device 12 and displays the user name indicated by the response so as to accompany the printed matter image in the displayed photo image. The printed matter history managing unit 42 of the image forming apparatus 2 determines a document image that agrees with the printed matter image on the basis of the printed matter history upon receiving the user inquiry and the printed matter image from the mobile terminal apparatus 1, and transmits to the mobile terminal apparatus 1, as the response of the user inquiry, the user name of the user associated with the determined document image.

Consequently, with keeping a style of a printed matter, a user who outputted the printed matter can be identified from the printed matter using the mobile terminal apparatus 1.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the user identifying program 16a may be stored in a non-transitory computer readable recording medium. In such a case, the user identifying program 16a is installed from the medium to the storage device 16.

What is claimed is:
1. An image forming system, comprising:
an image forming apparatus; and
a mobile terminal apparatus capable of communicating with the image forming apparatus;
wherein the image forming apparatus comprises (a) a printing device configured to output a printed matter obtained by printing a document image specified by a print request of a user, and (b) a printed matter history managing unit configured to store, as a printed matter history, the document image and a user name of the user to a predetermined storage device so as to associate the document image and the user name with each other;
the mobile terminal apparatus comprises an imaging device, a display device, and a user identifying unit;
the user identifying unit (a) extracts a printed matter image of the printed matter in a photo image taken by the imaging device, (b) transmits to the image forming apparatus a user inquiry with the printed matter image using a predetermined communication device, (c) receives from the image forming apparatus using a predetermined communication device a response that indicates a user name of a user of the document image that agrees with the printed matter image, and (d) displays the photo image on the display device and displays the user name indicated by the response so as to accompany the printed matter image in the displayed photo image; and
the printed matter history managing unit determines the document image that agrees with the printed matter image on the basis of the printed matter history upon receiving the user inquiry and the printed matter image from the mobile terminal apparatus, and transmits to the mobile terminal apparatus, as the response of the user inquiry, the user name of the user associated with the determined document image; wherein the user identifying unit (a) assigns plural identifiers to plural printed matter images respectively if the plural printed matter images are extracted in the photo image, (b) transmits to the image forming apparatus a user inquiry with the plural identifiers and the printed matter images associated with the plural identifiers using a predetermined communication device, (c) receives from the image forming apparatus using a predetermined communication device a response that indicates plural user names of plural document images that agree with the printed matter images respectively, and (d) displays the photo image on the display device and displays the plural user names indicated by the response so as to accompany the printed matter images in the displayed photo image respectively; and the printed matter history managing unit determines the document images that agree with the plural printed matter images respectively on the basis of the printed matter history upon receiving the user inquiry and the plural printed matter images from the mobile terminal apparatus, and transmits the response to the mobile terminal apparatus.

2. An image forming apparatus, comprising:

a printing device configured to output a printed matter obtained by printing a document image specified by a print request of a user; and a printed matter history managing unit configured to store, as a printed matter history, the document image and a user name of the user to a predetermined storage device so as to associate the document image and the user name with each other;

wherein the printed matter history managing unit determines the document image that agrees with a printed matter image on the basis of the printed matter history upon receiving a user inquiry and the printed matter image from a mobile terminal apparatus, and transmits to the mobile terminal apparatus, as the response of the user inquiry, a user name of a user associated with the determined document image;

wherein (a) if the document image to be printed agrees with an document image in the printed matter history, then the printed matter history managing unit (a1) embeds marking information in the document image to be printed, (a2) stores, as the printed matter history, the document image in which the marking information was embedded and a user name of the user so as to associate the document image and the user name with each other and (a3) the printed matter is obtained by printing the document image in which the marking information was embedded and (b) if the document image to be printed does not agree with any document images in the printed matter history, then the printed matter history managing unit (b1) does not embed the marking information in the document image to be printed, (b2) stores, as the printed matter history, the document image in which the marking information was not embedded and a user name of the user so as to associate the document image and the user name with each other and (b3) the printed matter is obtained by printing the document image in which the marking information was not embedded; and wherein when the document image to be printed agrees with a document image in the printed matter history, if the document image in which the marking information was embedded agrees with a document image in the printed matter history, then the printed matter history managing unit embeds other marking information than the embedded marking information.

* * * * *